US012801640B2

(12) United States Patent
Ganille et al.

(10) Patent No.: US 12,801,640 B2
(45) Date of Patent: Nov. 17, 2026

(54) ELECTRONIC DEVICE AND METHOD FOR GENERATING AN OBSTACLE DATABASE FOR AN AIRCRAFT, RELATED COMPUTER PROGRAM AND COMPUTER MEDIUM

(71) Applicant: THALES, Meudon (FR)

(72) Inventors: Thierry Ganille, Merignac (FR); François Leullier, Merignac (FR); Jean-Philippe Neuser, Toulouse (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 19/216,708

(22) Filed: May 23, 2025

(65) Prior Publication Data

US 2025/0371039 A1 Dec. 4, 2025

(30) Foreign Application Priority Data

May 31, 2024 (FR) ...................................... 2405676

(51) Int. Cl.
*G06F 7/00* (2006.01)
*G06F 16/00* (2019.01)
*G06F 16/29* (2019.01)

(52) U.S. Cl.
CPC .................................... *G06F 16/29* (2019.01)

(58) Field of Classification Search
USPC .................................. 707/710–770, 706–770
See application file for complete search history.

(56) References Cited

U.S. PATENT DOCUMENTS 12,182,336 B2 * 12/2024 Tran ......................... G05D 1/46
12,559,227 B1 * 2/2026 Moore .................... B64C 15/02
2004/0078122 A1 4/2004 Pippenger
2013/0282208 A1 * 10/2013 Mendez-Rodriguez ..................... G01S 17/933 701/16
2016/0293020 A1 * 10/2016 Block ...................... G08G 5/80
2018/0253984 A1 9/2018 Laplace et al.

OTHER PUBLICATIONS

FR 2405676, INPI Rapport de Recherche Preliminaire, Jan. 27, 2025, 2 pages.

* cited by examiner

*Primary Examiner* — Tuan A Pham
(74) *Attorney, Agent, or Firm* — Soquel Group LLC

(57) ABSTRACT

The invention relates to an electronic device for generating an obstacle database for an aircraft, comprising an acquisition module for an initial obstacle database, the initial obstacle database including elevation and position data for several obstacles, a creation module for at least one global obstacle volume at least partially encompassing a plurality of obstacles and including an envelope with an upper surface of area greater than a predefined minimum area, the upper surface having a constant elevation value and being, at least at one point, distant from the ground by at least a predefined minimum height, and a generation module for a modified obstacle database from the acquired initial obstacle database, the modified obstacle database including the at least one created global obstacle volume.

19 Claims, 6 Drawing Sheets

ELECTRONIC DEVICE AND METHOD FOR GENERATING AN OBSTACLE DATABASE FOR AN AIRCRAFT, RELATED COMPUTER PROGRAM AND COMPUTER MEDIUM

REFERENCE TO RELATED APPLICATION

This application is a U.S. non-provisional application claiming the benefit of French Patent Application No. 24 05676 filed on May 31, 2024, the contents of which are incorporated herein by reference in their entirety.

TECHNICAL FIELD OF THE INVENTION

The present invention relates to an electronic device for generating an obstacle database for an aircraft, the obstacle database being configured for use by an avionics system.

The invention also relates to a method for generating an obstacle database for an aircraft, the obstacle database being configured for use by an avionics system, the method being implemented by such an electronic generation device.

The invention also relates to a non-transitory computer-readable medium including a computer program including software instructions which, when executed by a computer, implement such a generation method.

The invention also relates to a non-transitory computer-readable medium, including an obstacle database for an aircraft, the obstacle database having been generated via such a generation method.

The invention relates to the field of obstacle databases for aircraft, used by avionics systems, particularly by systems for preventing and alerting aircraft of the risk of collision with obstacles. Each obstacle database is then, for example, included in the avionics system, such as the prevention and alert system; or stored on a computer medium connected to the avionics system, such as the prevention and alert system.

BACKGROUND OF THE INVENTION

Known systems include terrain awareness and warning systems for airplanes, also called TAWS (Terrain Awareness and Warning System), as well as terrain awareness and warning systems for helicopters, also called HTAWS (Helicopter TAWS).

These avionics systems are mandatory for commercial, transport, and regional airplanes and are becoming mandatory for helicopters. They are based on the presence, on board the aircraft, of a terrain database covering the operational area of the aircraft, in other words, a database containing ground altitude relative to sea level, also called MSL altitude (Medium Sea Level), at regular intervals defining the scale generally expressed in arc seconds (SA). A database may contain multiple scales depending on geography, for example, for airplanes, areas around airports have better resolution, for example, 3 SA, and for the rest of the earth less resolution, for example, 15 SA. For a system dedicated to helicopters that can potentially land anywhere, a more resolved database of 3 SA is typically preferred over the entire operational area of the aircraft, which is generally restricted for a helicopter.

The terrain database can be complemented by an obstacle database, the obstacle database including point obstacle data providing a radius and height relative to the ground for each obstacle in the database, and possibly linear obstacle data, for example, the high-voltage line network of an electrical system of the country with a height relative to the ground for each pylon of a line. This obstacle data is particularly useful for helicopters flying close to the ground.

TAWS or HTAWS systems then use the terrain and obstacle databases; the position provided by an aircraft positioning system; as well as flight parameters, such as heading, speed, and vertical speed, provided by aircraft sensors; to determine a risk of collision with the ground or an obstacle more or less close, and trigger different alert levels depending on the imminence of this risk of collision.

TAWS or HTAWS systems are also equipped with a display device to allow pilots to be aware of the risk of collision with the ground or obstacles. Usually, the display is two dimensional with a color code from green to red to illustrate the proximity of the ground around the aircraft, and obstacle symbols also colored from green to red depending on their relative altitudes compared to the aircraft.

The most recent alert and prevention systems are also equipped with a three dimensional representation allowing the display, in a synthetic vision system (SVS), of collision risks with the ground or obstacles, whether point or linear.

These systems are standardized and regulated, notably by the DO-367 standard, entitled "Minimum Operational Performance Standards (MOPS) for Terrain Awareness and Warning Systems (TAWS) Airborne Equipment".

However, these obstacle databases are not suitable for flights in dense urban environments where the very high number of obstacles poses performance problems for calculation and display on onboard equipment with limited resources.

SUMMARY OF THE INVENTION

The aim of the invention is then to propose an electronic device, and an associated method, for generating an obstacle database that is more suitable for flights in dense urban environments.

To this end, the invention has as its object an electronic device for generating an obstacle database for an aircraft, the obstacle database being configured for use by an avionics system, the device including:

- an acquisition module configured to acquire an initial obstacle database, the initial obstacle database includes elevation and position data for several obstacles;
- a creation module configured to create at least one global obstacle volume, each global obstacle volume at least partially encompassing a plurality of obstacles and includes an envelope with an upper surface area greater than a predefined minimum area, the upper surface having a constant elevation value and being, at least at one point, distant from the ground by at least a predefined minimum height; and
- a generation module configured to generate a modified obstacle database from the acquired initial obstacle database, the modified obstacle database including the at least one created global obstacle volume.

Thus, the generation device according to the invention allows to generate an obstacle database simplifying the calculation performed by a protection function vis-a-vis obstacles for generating an alert, this calculation being then performed relative to the global obstacle volume, rather than being relative to the plurality of unit obstacles encompassed by the global obstacle volume; or simplifying the display of one or more views of the external environment presented in the cockpit, by displaying only the global obstacle volume, rather than the plurality of unit obstacles.

According to other advantageous aspects of the invention, the electronic generation device includes one or more of the following features, taken individually or according to all technically possible combinations:

the creation module is configured to determine at least one obstacle grouping zone, each grouping zone having an obstacle density greater than a predefined minimum density and being associated with a respective global obstacle volume, and for each grouping zone, a number of fully encompassed obstacles divided by the total number of obstacles at least partially encompassed by the global obstacle volume is greater than a predefined minimum ratio;

the predefined minimum ratio being preferably greater than or equal to 0.8; preferably even greater than or equal to 0.9;

the creation module is configured to determine each grouping zone via a data partitioning algorithm, each grouping zone being polygonal in shape;

the partitioning algorithm being preferably a spatial clustering algorithm, preferably a density-based spatial clustering algorithm, such as a density-based spatial clustering of applications with noise algorithm;

the creation module is configured to determine each grouping zone from a mesh of an area covered by the initial obstacle database, by calculating for each mesh a density of obstacles and an elevation characteristic of the obstacles, then grouping the connected meshes having an elevation characteristic belonging to the same predefined range of elevation values and each presenting a density greater than a predefined minimum density;

the elevation characteristic being preferably equal to an average or maximum elevation of a predefined proportion of the obstacles included in the mesh;

the predefined proportion being preferably still substantially equal to 80% of the obstacles included in the mesh;

for each global obstacle volume, the constant elevation value of the upper surface is equal to the sum of a predefined margin and the maximum value of the elevations of the obstacles fully encompassed by the global volume;

for each global obstacle volume, the constant elevation value of the upper surface is equal to a predefined value;

the elevation is of a type chosen from among an altitude of the upper surface and a height relative to the ground of the upper surface;

the minimum predefined area is greater than or equal to 10 ha;

the minimum predefined height is greater than or equal to 30 meters;

the creation module is configured to create each global obstacle volume outside landing zone(s), vertiport(s), and clearance zone(s);

each clearance zone being preferably chosen from among the group consisting of; a park, and a stadium; and the generation module is configured, during the generation of the modified obstacle database, to delete each obstacle fully encompassed by a respective global obstacle volume.

The invention also relates to a method for generating an obstacle database for an aircraft, the obstacle database being configured for use by an avionics system, the method being implemented by an electronic generation device and including the following steps:

acquire an initial obstacle data database, the initial obstacle database includes elevation and position data for several obstacles;

create at least one global obstacle volume, each global obstacle volume at least partially encompassing a plurality of obstacles and including an envelope with an upper surface area greater than a minimum predefined area, the upper surface having a constant elevation value and being, at least at one point, distant from the ground by at least a minimum predefined height; and generate a modified obstacle database from the acquired initial obstacle database, the modified obstacle database including the at least one created global obstacle volume.

The invention also relates a non-transitory computer-readable medium including a computer program including software instructions which, when executed by a computer, implement a generation method such as defined above.

The invention also relates to a non-transitory computer-readable medium, including an obstacle database for an aircraft, the obstacle database having been generated via a generation method as defined above.

BRIEF DESCRIPTION OF THE DRAWINGS

These features and advantages of the invention will become clearer upon reading the following description, given solely by way of a non-limiting example, and made with reference to the appended drawings, wherein.

DETAILED DESCRIPTION OF THE INVENTION

In the following description, the expression "substantially equal to" defines an equality relationship of plus or minus 20%, preferably plus or minus 10%, preferably even plus or minus 5%.

Figure 1:
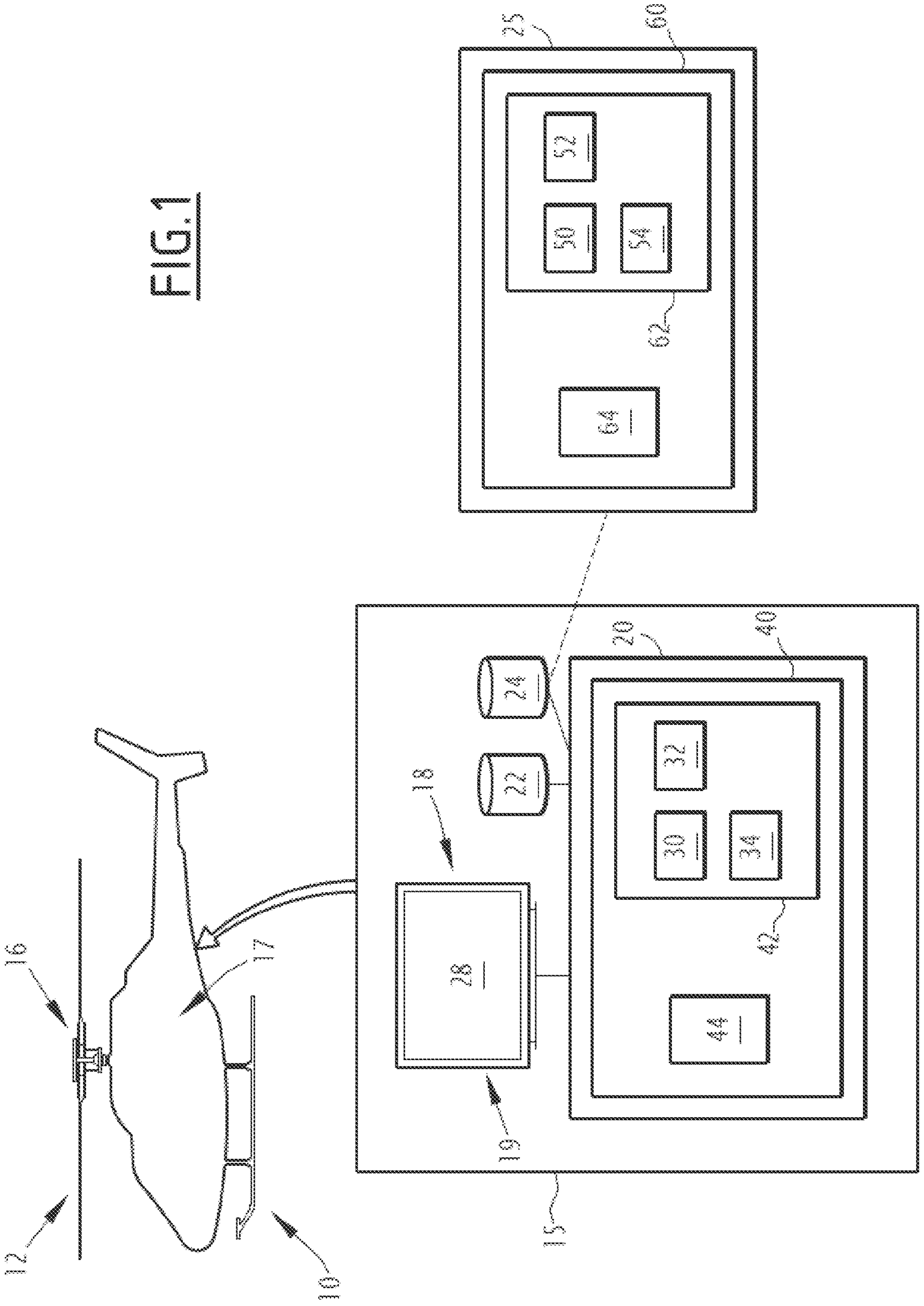
FIG. 1 is a schematic view of a civil aircraft according to the invention, including a propulsion system and an avionics installation including an electronic information display system, an electronic collision risk prevention system for the aircraft, a terrain database, and an obstacle database; the obstacle database having been generated by an electronic generation device and including at least one global obstacle volume at least partially encompassing a plurality of obstacles.

In FIG. 1, a civil aircraft 10 includes a propulsion system 12 and an avionics installation 15 for piloting assistance, the avionics installation 15 being intended to be onboard the aircraft 10.

The civil aircraft 10 is, in particular, a rotary-wing aircraft, such as a civil helicopter, as represented in FIG. 1. Alternatively, the civil aircraft 10 is a commercial airplane, an urban air mobility vehicle, also called a UAM vehicle (Urban Air Mobility), or even a civil drone remotely piloted by a teleoperator.

The propulsion system 12 includes at least one engine 16 and at least one energy reservoir 17. The propulsion system 12 is, for example, a combustion propulsion system, and each engine 16 is then a combustion engine, the or each energy reservoir 17 being a fuel tank. Alternatively, the propulsion system 12 is an electric propulsion system, and each engine 16 is then an electric motor, each energy reservoir 17 including an electric battery and/or a fuel cell. Alternatively, again, the propulsion system 12 is a hybrid propulsion system including several engines 16, namely at least one combustion engine and at least one electric motor. The at least one energy reservoir 17 then includes at least one fuel tank and at least one electric battery and/or a fuel cell.

The piloting assistance installation 15 includes an electronic information display system 18, a human machine interface 19, and an electronic collision risk prevention system 20 for the aircraft 10, the prevention system 20 being connected to the information display system 18.

In the example of FIG. 1, the piloting assistance installation 15 also includes a first database 22, also called a terrain database, and a second database 24, also called an obstacle database, the second database 24 being then distinct from the first database 22. The obstacle database is generated by an electronic generation device 25, also represented in FIG. 1.

Alternatively, not represented, the terrain database and the obstacle database are grouped into a single database, and the piloting assistance installation 15 then includes the database. According to this alternative, the part of the database corresponding to the obstacle data is also generated by the electronic generation device 25.

The information display system 18 typically includes an information display screen 28.

The human machine interface 19 is, for example, integrated into the screen 28 of the information display system 18 in the form of a touchscreen.

According to another example, the human machine interface 19 is a real keyboard, that is, physical, or a virtual keyboard, or even an actionable cursor connected to the information display system 18.

The human machine interface 19 is able to allow the operator to select elements or enter data.

The prevention system 20 includes a module 30 for receiving a position of the aircraft 10, a module 32 for acquiring at least one obstacle volume, and a module 34 for commanding at least one action from among the display of the at least one obstacle volume and the generation of an alert in case of risk of penetration of the aircraft 10 into a respective obstacle volume.

In the example of FIG. 1, the electronic prevention system 20 includes a first information processing unit 40 formed, for example, of a first memory 42 and a first processor 44 associated with the first memory 42.

In the example of FIG. 1, the reception module 30, the acquisition module 32, and the command module 34 are each in the form of software, or a software brick, executable by the first processor 44. The first memory 42 of the electronic prevention system 20 is then able to store reception software, acquisition software, and command software. The first processor 44 is then able to execute each of the software from among the reception software, the acquisition software, and the command software.

Alternatively, not represented, the reception module 30, the acquisition module 32, and the command module 34 are each in the form of a programmable logic component, such as an FPGA (Field Programmable Gate Array), or even in the form of a dedicated integrated circuit, such as an ASIC (Application Specific Integrated Circuit).

When the electronic prevention system 20 is in the form of one or more software, in other words, in the form of a computer program, it is also able to be recorded on a medium, not represented, readable by a computer. The computer-readable medium is, for example, a medium able to store electronic instructions and to be coupled to a bus of a computer system. For example, the readable medium is an optical disk, a magneto-optical disk, a ROM memory, a RAM memory, any type of non-volatile memory (for example, EPROM, EEPROM, FLASH, NVRAM), a magnetic card, or an optical card. On the readable medium is then stored a computer program including software instructions.

The electronic generation device 25 includes an acquisition module 50 for acquiring an initial obstacle database, a creation module 52 for creating at least one global obstacle volume VGO, and a generation module 54 for generating a modified obstacle database.

In the example of FIG. 1, the electronic generation device 25 includes a second information processing unit 60 formed, for example, of a second memory 62 and a second processor 64 associated with the second memory 62.

In the example of FIG. 1, the acquisition module 50, the creation module 52, and the generation module 54 are each in the form of software, or a software brick, executable by the second processor 64. The second memory 62 of the electronic generation device 25 is then able to store acquisition software, creation software, and generation software. The second processor 64 is then able to execute each of the software from among the acquisition software, the creation software, and the generation software.

Alternatively, not represented, the acquisition module 50, the creation module 52, and the generation module 54 are each in the form of a programmable logic component, such as an FPGA (Field Programmable Gate Array), or even in the form of a dedicated integrated circuit, such as an ASIC (Application Specific Integrated Circuit).

When the electronic generation device 25 is in the form of one or more software, in other words, in the form of a computer program, it is also able to be recorded on a medium, not represented, readable by a computer. The computer-readable medium is, for example, a medium capable of storing electronic instructions and being coupled to a bus of a computer system. For example, the readable medium is an optical disk, a magneto-optical disk, a ROM memory, a RAM memory, any type of non-volatile memory (for example, EPROM, EEPROM, FLASH, NVRAM), a magnetic card, or an optical card. On the readable medium is then stored a computer program including software instructions.

The reception module 30 is configured to receive the position of the aircraft 10 and is known per se. The reception module 30 is, for example, configured to receive the position from an aircraft positioning system 10, such as a satellite positioning system, also called a GNSS system (Global Navigation Satellite System).

The acquisition module 32 is configured to acquire, from the obstacle database 24 and based on the position of the aircraft 10, at least one obstacle volume.

Figure 2:
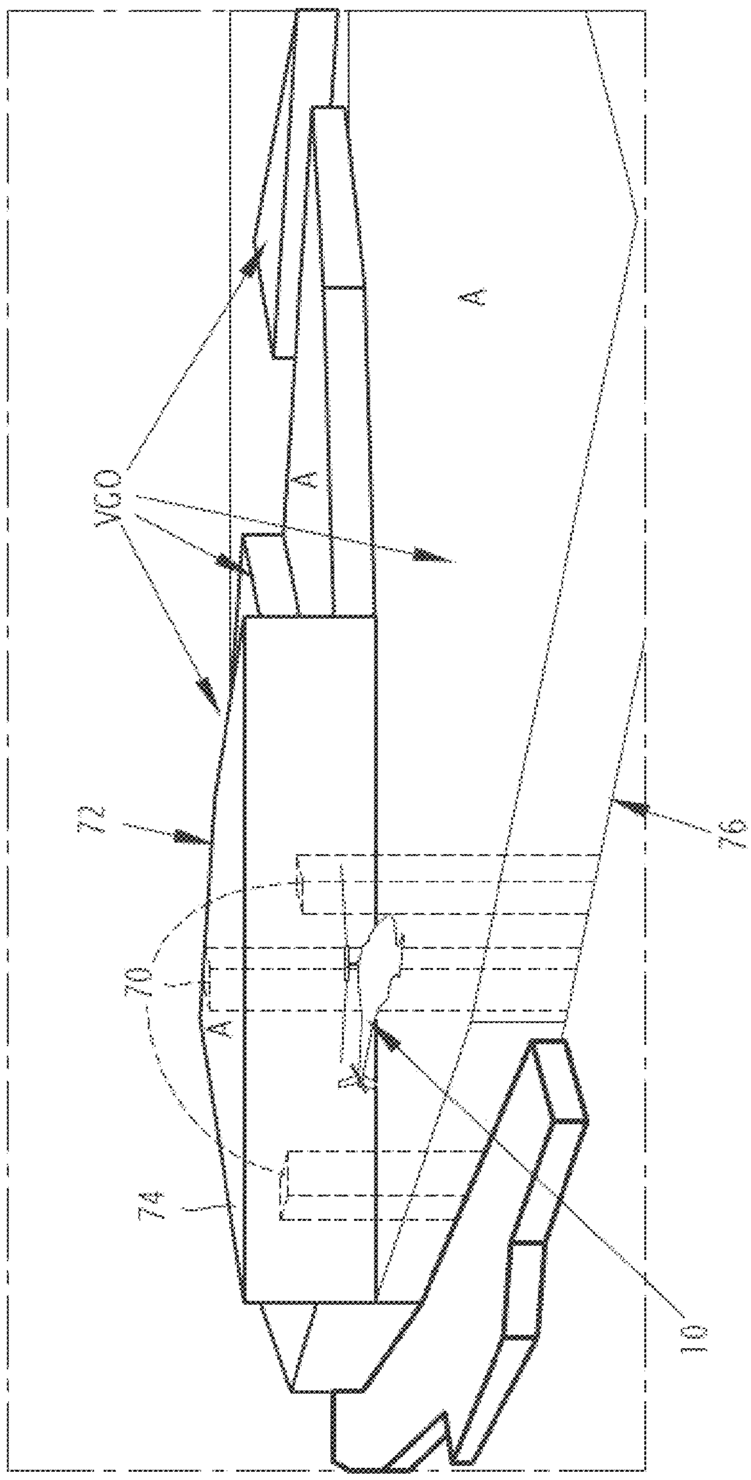
FIG. 2 is a schematic view of a dense urban zone with several global obstacle volumes.
Figure 4:
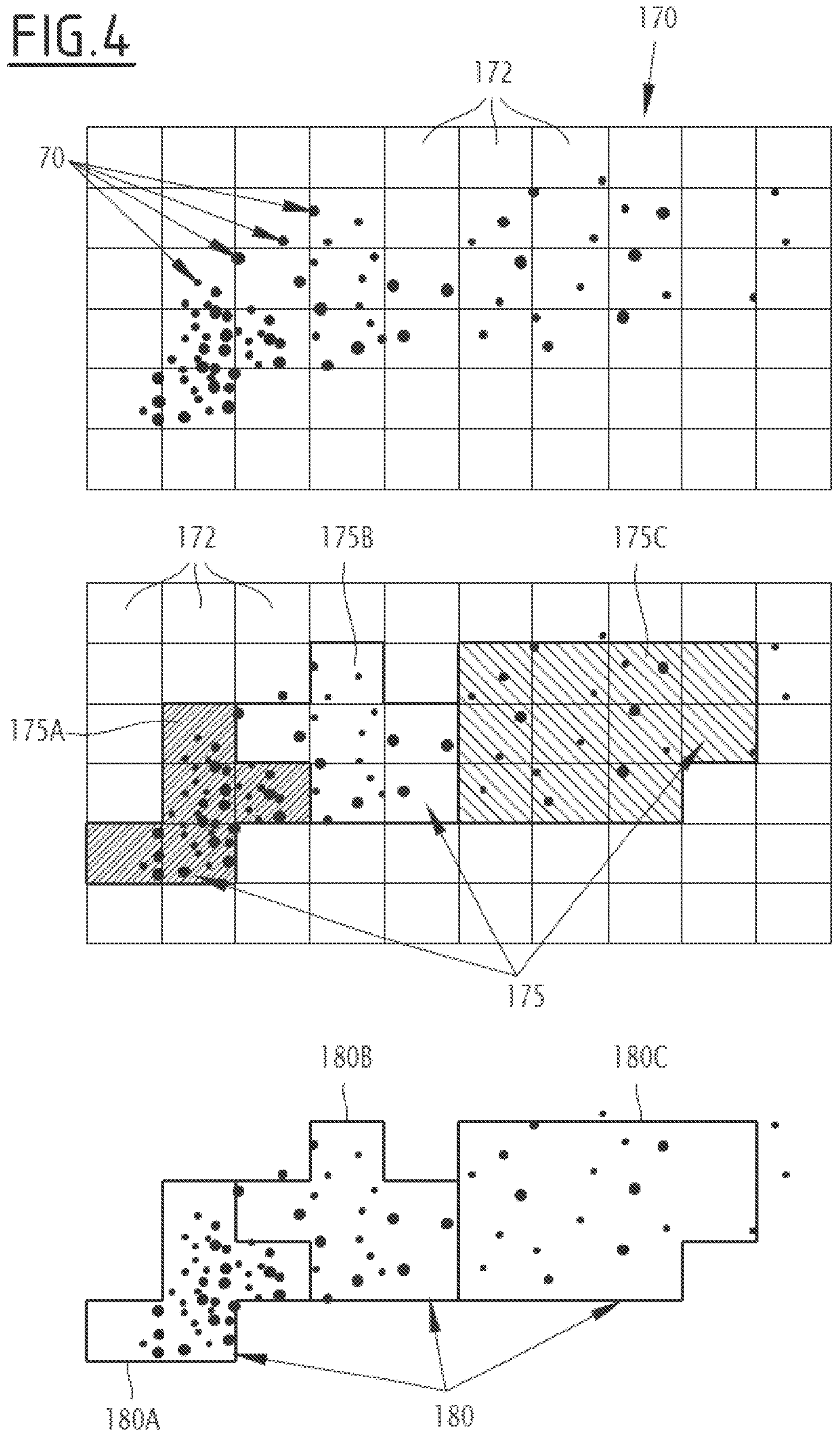
FIG. 4 is a representation similar to that of FIG. 3, according to a second embodiment.

According to the invention, at least one obstacle volume is a global obstacle volume VGO at least partially encompassing a plurality of obstacles 70, as illustrated in FIGS. 2 and 4.

Each global obstacle volume VGO includes an envelope 72 with an upper surface 74 of area A greater than a predefined minimum area $A_{min}$, the upper surface 74 having a constant elevation ELV value and being, at least at one point, distant from the ground by at least a predefined minimum height $H_{min}$.

The predefined minimum area $A_{min}$ is typically greater than or equal to 10 ha, in other words, greater than or equal to 100,000 $m^2$. The predefined minimum height $H_{min}$ is, for example, greater than or equal to 30 meters.

Each global obstacle volume VGO, vertically encompasses at least partially the plurality of obstacles 70. In other words, each global obstacle volume encompasses at least partially according to a vertical direction, the plurality of obstacles 70. The obstacles 70 are fully encompassed, horizontally, in the corresponding global obstacle volume VGO. In other words, the obstacles 70 are, according to a horizontal plane perpendicular to the vertical direction, fully encompassed in the global obstacle volume VGO.

The skilled person will then understand that all the obstacles 70 of the plurality of obstacles 70 associated with a global obstacle volume VGO are horizontally, in other words, according to the horizontal plane, fully encompassed by the global obstacle volume VGO; and vertically, in other words, according to the vertical direction, at least partially encompassed by the global obstacle volume VGO, some obstacles 70 being fully encompassed, both horizontally and vertically, by the global obstacle volume VGO, and potentially other obstacles 70 being encompassed horizontally, but only partially in the vertical direction, by the global obstacle volume VGO. An obstacle is fully encompassed vertically if it is an obstacle 70 having an elevation lower than that of the upper surface 74 of the corresponding global obstacle volume VGO.

In the example of FIG. 2, several global obstacle volumes VGO are represented, with a constant elevation value, ELV, varying from one global obstacle volume VGO to another.

The elevation ELV is typically an altitude ALT of the upper surface 74 or a height H relative to the ground 76 of the upper surface 74.

Figure 5:
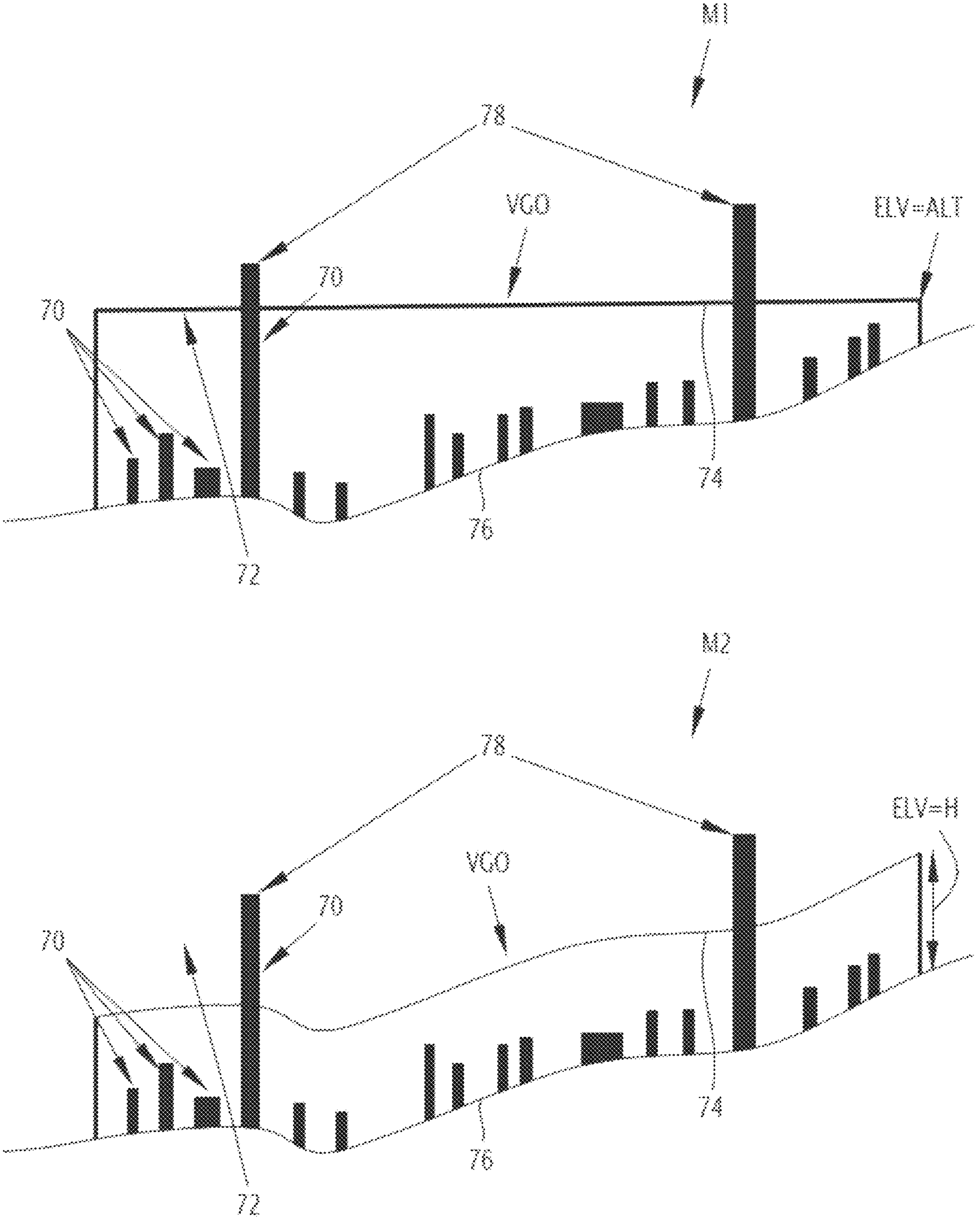
FIG. 5 is a schematic representation illustrating a first mode M1 where the elevation of an upper surface of a global obstacle volume with a constant value is the altitude of the upper surface, and respectively a second mode M2 where the elevation of the upper surface of a global obstacle volume with a constant value is the height of the upper surface relative to the ground.

According to a first mode M1, visible in FIG. 5, the elevation ELV of the upper surface 74 with a constant value is the altitude ALT of the upper surface 74. In other words, according to this first mode M1, each global obstacle volume VGO has its upper surface 74 presenting a constant altitude ALT value.

According to a second mode M2, also visible in FIG. 5, the elevation ELV of the upper surface 74 of which a constant value is the height H of the upper surface 74 relative to the ground 76. In other words, according to this second mode M2, each global obstacle volume VGO has its upper surface 74 presenting a constant height H value relative to the ground 76.

The skilled person will observe that the first mode M1 is equivalent to the second mode M2 when the ground 76 presents a constant altitude over the entire respective global obstacle volume VGO, as in the example of FIG. 2; and as a result, that the first mode M1 results in a different upper surface 74 than that acquired according to the second mode M2 only when the altitude of the ground 76 varies within the respective global obstacle volume VGO.

The mode from among the first mode M1 and the second mode M2 is likely to vary from one global obstacle volume VGO to another. In other words, when several global obstacle volumes VGO are acquired by the acquisition module 32, the constant elevation ELV value is, for example, of a variable type from one global obstacle volume VGO to another.

Alternatively, the mode from among the first mode M1 and the second mode M2 is identical from one global obstacle volume VGO to another. In other words, according to this alternative, when several global obstacle volumes VGO are acquired by the acquisition module 32, the constant elevation ELV value is of the same type for all the global obstacle volumes VGO.

Figure 3:
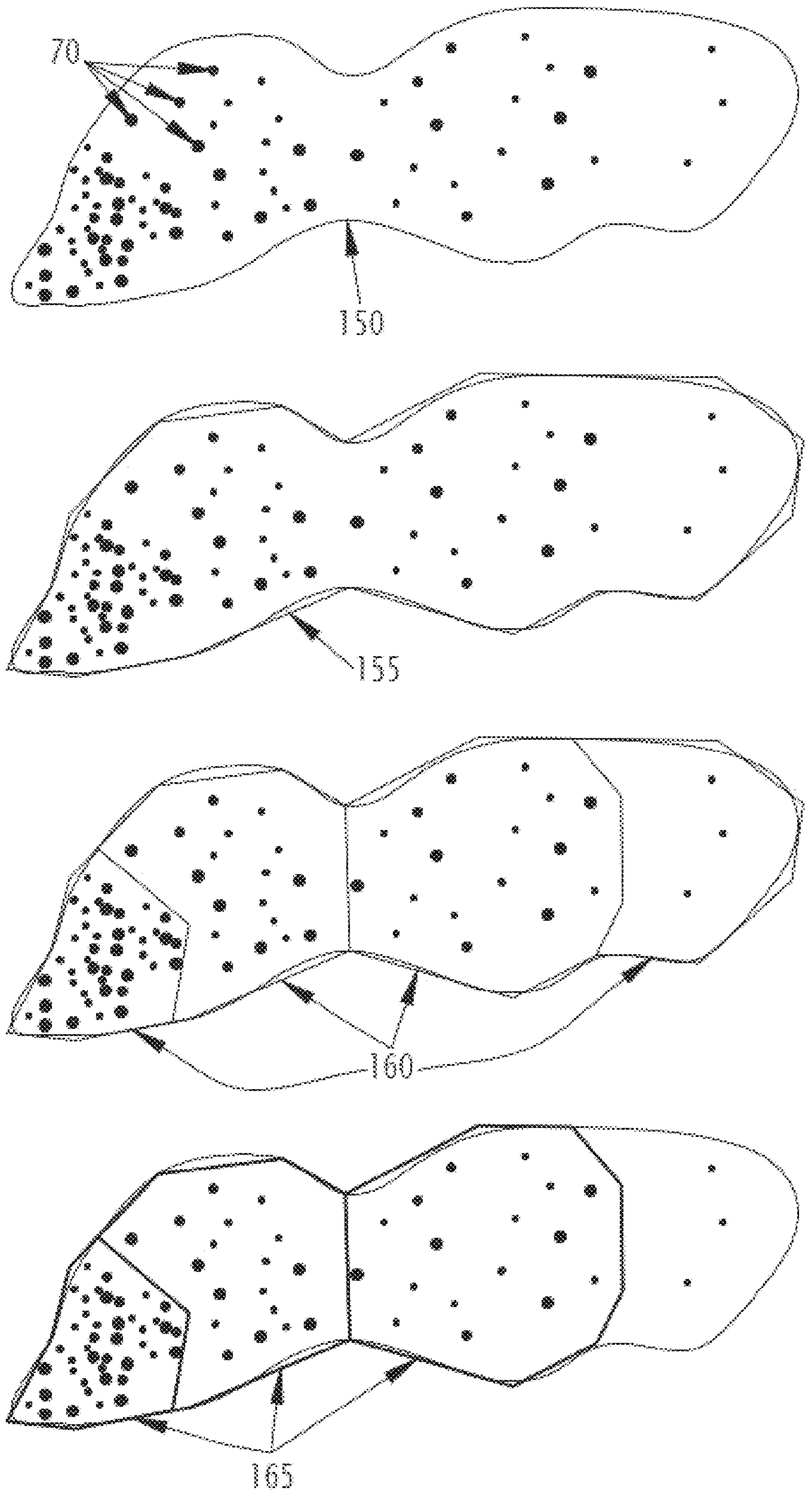
FIG. 3 is a schematic representation illustrating the grouping of obstacles by grouping zones for the creation of global obstacle volumes, according to a first embodiment.

Advantageously, if a respective obstacle 70 from among the plurality of obstacles 70 is only partially encompassed by a corresponding global obstacle volume VGO and presents an elevation value greater than that of the upper surface 74 of the global obstacle volume VGO, then the obstacle is represented in relief relative to the envelope 72 of the global obstacle volume VGO, the top 78 of this obstacle protruding from the upper surface 74 of the global obstacle volume VGO, as represented on the views SVS and VD in FIG. 3, or even in the example of FIG. 4.

Advantageously again, the constant elevation ELV value of the upper surface 74 of the corresponding global obstacle volume VGO is determined in such a way that the number of obstacles 70 protruding from the upper surface 74 divided by the total number of obstacles 70 at least partially encompassed by the corresponding global obstacle volume VGO is less than a predefined maximum ratio $R_{max}$. In other words, according to this advantageous aspect, the constant elevation ELV value of the upper surface 74 of the corresponding global obstacle volume VGO is determined so that the number of obstacles 70 that are only partially encompassed by the corresponding global obstacle volume VGO represents, relative to the total number of obstacles 70 encompassed by the global obstacle volume VGO, whether partially or fully, a proportion, or even a percentage less than this predefined maximum ratio $R_{max}$.

The predefined maximum ratio $R_{max}$ is preferably less than or equal to 0.2, that is, 20%; preferably even less than or equal to 0.1, that is, 10%. In other words, when the predefined maximum ratio $R_{max}$ is less than or equal to 0.2, at most 20% of the obstacles 70 are only partially encompassed by a respective global obstacle volume VGO, the remaining 80% being fully encompassed by the global obstacle volume VGO. Similarly, when the predefined maximum ratio $R_{max}$ is less than or equal to 0.1, at most 10% of the obstacles 70 are only partially encompassed by a respective global obstacle volume VGO, the remaining 90% being fully encompassed by the global obstacle volume VGO.

The command module 34 is configured to command at least one action from among the display, on the display screen 28, of the at least one obstacle volume, and the generation of an alert in case of risk of penetration of the aircraft 10 into a respective obstacle volume.

Advantageously, the envelope 72 of the global obstacle volume VGO presents a transparency greater than 20% when the global obstacle volume VGO is displayed on the display screen 28. This display of the envelope 72 of the global obstacle volume VGO with a transparency greater than 20% then allows the operator of the aircraft 10, such as the pilot, to visualize both the global obstacle volume VGO and by transparency cultural data (rivers, roads, railways, . . . ) located below the global obstacle volumes VGO.

Alternatively, an opaque display, in other words, with a transparency less than the predefined minimum value, allows favoring graphic performance.

Only the obstacles 70 the top 78 of which protrudes from the upper surface 74 of the corresponding global obstacle volume VGO are displayed in the form of unit obstacles, typically in the shape of a three-dimensional cylinder, with height and diameter just slightly greater than those of the real obstacle, for example, with height and diameter greater by 10%, preferably even 5%, than those of the real obstacle.

Advantageously again, the envelope 72 of the global obstacle volume VGO presents a variable color depending on an altitude difference between an altitude of the aircraft 10 and an altitude ALT of the upper surface 74 of the envelope 72. For example, a volume below the aircraft 10 and representing no short-term incursion risk is displayed in green, a volume close to the altitude of the aircraft 10 is presented in khaki; and a volume higher than the altitude of the aircraft 10 is presented in brown.

Alternatively, this variable color display is based on five altitude and color ranges: below −1000 ft (feet in English, or pieds in French) in dark green; −1000 ft to −500 ft in green; −500 ft to +500 ft in khaki; +500 ft to +1500 ft in dark brown; and above 1500 ft in light brown.

For alert generation, any intrusion or threat of intrusion into obstacle volumes, particularly into a corresponding global obstacle volume VGO, and outside specific zones (vertiports, clearances . . . ), is subject to a specific visual and/or sound indication, prompting the pilot to regain altitude to exit the obstacle volume or to switch to flight rules based on visual detection of the terrain and obstacles if external visibility allows.

The generation of the obstacle database 24 for the aircraft 10 by the electronic generation device 25 will now be described, the obstacle database 24 being configured for use by an avionics system, such as the electronic prevention system 20.

The acquisition module 50 is configured to acquire an initial obstacle database, the initial obstacle database includes elevation and position data for several obstacles 70. The skilled person will understand that the initial obstacle database is typically an initial version of the obstacle database 24.

The creation module 52 is configured to create at least one global obstacle volume VGO.

The creation module 52 is, for example, configured to determine at least one obstacle grouping zone 70, each grouping zone having an obstacle 70 density greater than a predefined minimum density and being associated with a respective global obstacle volume VGO, and for each grouping zone, a number of fully encompassed obstacles 70 divided by the total number of obstacles 70 at least partially encompassed by the global obstacle volume VGO is greater than a predefined minimum ratio $R_{min}$. The predefined minimum ratio $R_{min}$ is preferably greater than or equal to 0.8; preferably even greater than or equal to 0.9.

In the horizontal plane, two embodiment examples are presented below to define the limits of the global obstacle volumes VGO.

According to a first embodiment, illustrated in FIG. 3, the creation module 52 is configured to determine each grouping zone via a data partitioning algorithm, each grouping zone being polygonal in shape.

The partitioning algorithm is typically chosen from among spatial clustering algorithms (spatial clustering), also called spatial clustering methods or even spatial partitioning methods, particularly density-based spatial clustering (density-based spatial clustering), such as the DBSCAN algorithm or method (Density-Based Spatial Clustering of Applications with Noise), or density-based spatial clustering of applications with noise algorithm.

This first embodiment example relies, for example, on a delimitation 150 of urban zones, as provided by open data services like Copernicus, which, from satellite data, provide a digital mapping of the nature of the ground, for example, among others, fields, forests, deserts, or urban zones. These urban zones can be defined with significant granularity, potentially involving too heavy a processing for an onboard avionics system.

Thus, optionally, a first phase consists of generating simpler polygons, in other words, with fewer segments, to delimit urban zones, as represented in FIG. 3 with a simplification polygon 155 resulting from the initial delimitation 150. This first phase is, for example, carried out by implementing the Doulas-Peucker algorithm. The urban zones thus defined can cover vast geographical areas with very variable obstacle heights and densities within an urban zone, for example, in the territory of large metropolises.

Thus, a second phase, also optional, consists of dividing the polygons 155 resulting from the first step into several polygons 160, also called sub-polygons, characterized by more homogeneous obstacle heights and densities, typically using the aforementioned partitioning algorithm.

During a third phase, from among the different polygons 160 acquired for an urban zone, only those including an obstacle density greater than a predefined threshold become the respective base 165 of a corresponding global obstacle volume VGO.

The other polygons, in other words, the polygons other than those serving as the base for a respective global obstacle volume VGO, are not retained; and the obstacles included in these other polygons are then retained in the obstacle database 24. For example, a suburban neighborhood without any obstacle listed in the obstacle database 24 of a larger urban zone will not be part of a global obstacle volume VGO, while the city center of this same urban zone with a high obstacle density will be covered by a respective global obstacle volume VGO.

According to a second embodiment, illustrated in FIG. 4, the creation module 52 is configured to determine each grouping zone from a mesh 170 of an extended area covered by the initial obstacle database, the mesh 170 including a plurality of meshes 172; by calculating for each mesh 172 an obstacle 70 density and an elevation characteristic of the obstacles 70; then grouping the connected meshes having an elevation characteristic belonging to the same predefined range of elevation values and each presenting a density greater than a predefined minimum density.

The elevation characteristic is, for example, an average elevation or a maximum elevation of a predefined proportion of the obstacles 70 included in the mesh. The predefined proportion is advantageously substantially equal to 80% of the obstacles 70, included in the mesh.

For this second embodiment, the mesh 170, square or rectangular, covers the entire geographical zone of the obstacle database 24 independently of the nature of the ground, urban zone or not. This mesh 170 is typically defined in meters or degrees, for example, a mesh of squares with 2,000 meter sides or a rectangular mesh of 0.01 degrees of latitude and longitude. Each mesh 172 is then typically in the shape of a square with 2 km sides or even a rectangle of 0.01 degrees of latitude and longitude.

The next phase consists of calculating the obstacle density and a characteristic of the obstacle heights, for example, average or maximum height of 80% of the lowest obstacles, for each of the meshes 172 of the treated geographical zone.

Then, for the meshes 172 including an obstacle density greater than a certain threshold, the grouping of connected meshes with similar characteristics in terms of the obstacle 70 height values is carried out, based on a few height thresholds, as represented with the groupings 175 in FIG. 4. In FIG. 4, a first grouping 175A corresponds to a first range of obstacle 70 height values; a second grouping 175B corresponds to a second range of obstacle 70 height values, distinct from the first range; and a third grouping 175C corresponds to a third range of obstacle 70 height values, distinct from the first and second ranges. In FIG. 4, the first 175A, the second 175B, and the third 175C groupings are represented with three different types of filling to distinguish them from each other, the first grouping 175A being filled with close hatching, the second grouping 175B having no hatching, and the third grouping 175C being filled with more spaced hatching than the first grouping 175A. These groupings 175 of the initial mesh 170 then form the bases 180 of the global obstacle volumes VGO. In FIG. 4, a first base 180A of a first global obstacle volume VGO is then associated with the first grouping 175A; a second base 180B of a second global obstacle volume VGO is associated with the second grouping 175B; and a third base 180C of a third global obstacle volume VGO is associated with the third grouping 175C.

Advantageously, this second embodiment example allows global obstacle volumes VGO outside urban zones to be created, such as around a wind farm, for example.

In the vertical plane, the limits of the global obstacle volumes VGO are, for example, defined according to two embodiment examples.

A first embodiment corresponds to the first mode M1, visible in FIG. 5, and consists of defining the altitude of a flat surface representing the upper surface 74 of the global obstacle volume VGO. This altitude is not necessarily above all the obstacles 70, such an approach could indeed lead to a global obstacle volume VGO unnecessarily too high over a large part of the urban zone. For example, in Paris, a protection volume covering the Eiffel Tower and the Montparnasse Tower would force UAMs to operate unnecessarily high over the vast majority of the Parisian urban zone. The predefined minimum ratio $R_{min}$, for example, 80% or 90%, then represents the quantity of obstacles 70 to be covered by the global obstacle volume VGO, and thus advantageously the quantity of obstacles 70 to be removed from the obstacle database 24. The altitude ALT of the upper surface of the protection volume is then, for example, equal to the altitude of the top of the highest removed obstacles to which a predefined margin is added. The remaining obstacles, in small numbers and therefore not penalizing for the protection function calculations and the display function, remain treated individually and are represented as protruding from the global obstacle volumes VGO.

Still in the vertical plane, a second embodiment example, corresponds to the second mode M2, visible in FIG. 5, and no longer consists of defining the altitude ALT, but the height H above the ground 76 of the global obstacle volume VGO. The upper surface 74 of the global obstacle volume VGO is no longer a flat surface, but a surface reproducing the terrain relief shifted upward by the height of the global obstacle volume VGO, as represented in the second mode M2 in FIG. 5. Again, the definition of the height H of the global obstacle volume VGO typically takes into account the predefined minimum ratio $R_{min}$ of obstacles to be removed from the obstacle database 24, the highest remaining obstacles being displayed above the global obstacle volume VGO. The height H of the global obstacle volume VGO is then equal to the height of the highest removed obstacles to which the predefined margin is added.

For each global obstacle volume VGO, the constant elevation ELV value of the upper surface 74 is, for example, equal to the sum of a predefined margin and the maximum value of the elevations of the obstacles 70 fully encompassed by the global volume VGO.

The predefined margin is, for example, equal to a predefined percentage of the maximum value of the elevations of the obstacles fully encompassed by the global volume. The predefined margin is, for example, a predefined percentage of the maximum value of obstacles fully encompassed by the global volume. The predefined percentage is, for example, between 1% and 10%, preferably substantially equal to 5%.

Alternatively, the predefined margin is a value predefined by an air traffic regulation authority, for example, between 200 ft and 1000 ft, preferably substantially equal to 500 ft.

In the vertical plane, the first embodiment example, is advantageous for the urban zones built on a ground 76 with little relief but can become penalizing for urban zones on a steep relief as it involves an altitude of the upper surface 74 of the global obstacle volume VGO unnecessarily high for the lower parts of the city.

In the vertical plane, the second embodiment example, is advantageous for urban zones on a steep relief and presents less interest for urban zones with low relief.

Thus, advantageously, a combination of the two embodiment examples in the vertical plane is likely to be implemented. The constant elevation ELV value is then of a variable type from one global obstacle volume VGO to another. In other words, for some global obstacle volumes VGO, the constant elevation ELV value is the altitude ALT of the upper surface 74 according to the first mode M1; and for other global obstacle volumes VGO, the constant elevation ELV value is the height H of the upper surface 74 relative to the ground 76 according to the second mode M2.

The skilled person will observe that, in the vertical plane, the second embodiment example, may consist of including the global obstacle volume VGO directly in the terrain database 22 by raising each elevation value of the base 22 by the height of the global obstacle volume VGO for the urban zone to be protected. The advantage of this technique lies in the absence of specific processing of the global obstacle volume VGO, no database storage, no protection function calculation, and no volume display, all processing being performed on the terrain.

As an alternative to these two embodiment examples in the vertical plane, the altitude ALT or the height H of the global obstacle volume VGO is not determined based on the predefined minimum ratio $R_{min}$, but directly by a height constant. For example, as an alternative to the first embodiment example, the altitude of the upper surface 74 of the global obstacle volume VGO is set substantially 100 meters above the maximum terrain altitude on the surface of the global obstacle volume VGO. As an alternative, of the second embodiment example, the height H of the upper surface 74 of the global obstacle volume VGO is set, for example, substantially equal to 100 meters.

According to this alternative, for each global obstacle volume VGO, the constant elevation ELV value of the upper surface 74 is equal to a predefined value.

The skilled person will, of course, understand that the different embodiment examples in the vertical plane and in the horizontal plane can be combined in all possible ways to define the global obstacle volume VGO in three dimensions.

Advantageously, the creation module 52 is configured to create each global obstacle volume VGO outside landing zones, vertiports, and clearance zones. Each clearance zone is typically defined from a clearance zone database specific to each operator based on the characteristics of the operated aircraft. Each clearance zone is, for example, a park or a stadium.

According to this advantageous aspect, after the creation of the global obstacle volumes VGO as described above, the creation module 52 is then configured to exclude landing zones, vertiports, as well as any clearance zones, for example, a park or even a stadium, from these global obstacle volumes VGO. These zones are, for example, defined in a specific database, it may be a circle around a vertiport, a certain number of corridors leading to the vertiport, or even any shape defining a clearance zone. These zones are then subtracted from the previously defined global obstacle volumes VGO to acquire their final shapes. The obstacles belonging to these exclusion zones are then retained in unit form in the obstacle database 24. In some cases, vertiports are installed on the roof of a building, and in this case, an exclusion zone of the global obstacle volume VGO will be defined only if the altitude of the vertiport is lower than the altitude of the upper surface 74 of the global obstacle volume VGO.

The generation module 54 is configured to generate a modified obstacle database from the acquired initial obstacle database, the modified obstacle database includes the at least one created global obstacle volume VGO. The skilled person will understand that the modified obstacle database is typically a modified version of the obstacle database 24.

Advantageously, the generation module 54 is configured to, during the generation of the modified obstacle database, to delete each obstacle 70 fully encompassed by a respective global obstacle volume VGO.

Figure 6:
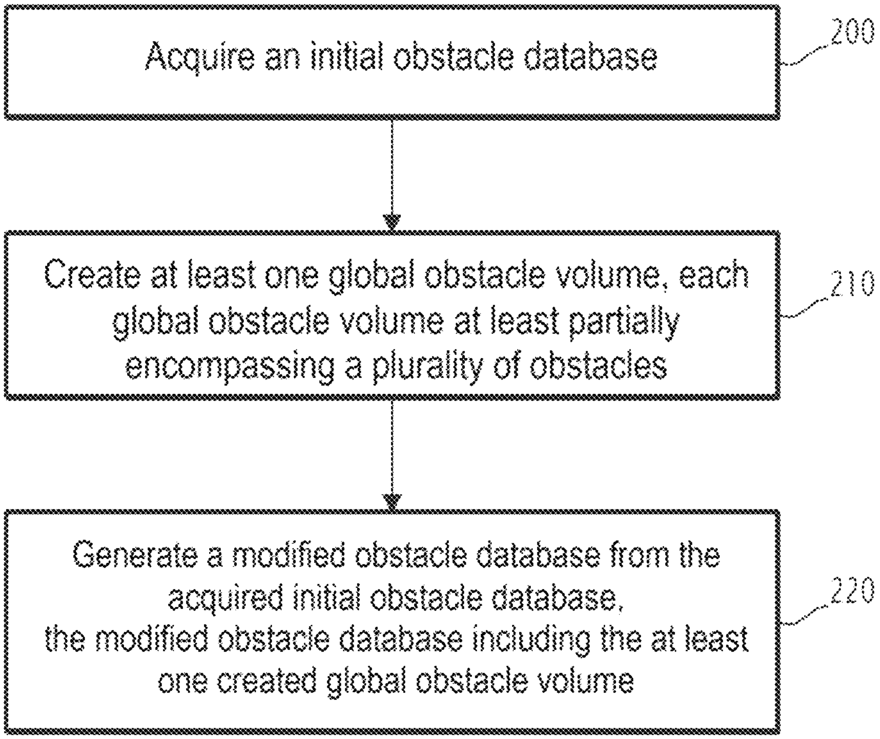
FIG. 6 is a flowchart of a method, according to the invention, for generating an obstacle database for the aircraft, the method being implemented by the generation device of FIG. 1.

The operation of the electronic piloting assistance installation 15, and in particular of the generation device 25, will now be explained, in particular, with the help of FIG. 6, representing a flowchart of the method, according to the invention, for generating the obstacle database 24 for the aircraft 10.

During an initial step 200, the generation device 25 acquires, via its acquisition module 50, the initial obstacle database including elevation and position data for several obstacles 70. The initial obstacle database is typically an initial version of the obstacle database 24.

At the end of the acquisition step 200, the generation device 25 moves to the next step 210 during which it creates, via its creation module 52, at least one global obstacle volume VGO.

According to the invention, at least one obstacle volume created during the creation step 210 is a respective global obstacle volume VGO at least partially encompassing several obstacles 70. The envelope 72 of each global obstacle volume VGO has its upper surface 74 of area A greater than the predefined minimum area $A_{min}$, of constant elevation ELV value, and, at least at one point, distant from the ground 76 by at least the predefined minimum height $H_{min}$.

The creation of the or each global obstacle volume VGO is carried out in the manner described above.

At the end of the creation step 210, the generation device 25 generates, during a next step 220 and via its generation module 54, the modified obstacle database from the acquired initial obstacle database during the acquisition step 200, the modified obstacle database including the at least one global obstacle volume (VGO) created during the creation step 210. The modified obstacle database is then typically a modified version of the obstacle database 24.

The skilled person will, of course, understand that the obstacle database 24 configured for use by the avionics system, such as the prevention system 20, is then the modified obstacle database, such as the modified version of the obstacle database 24.

Thus, the generation device 25 and the generation method according to the invention allow to drastically reduce the number of obstacles 70 stored in the obstacle database 24, in particular, on the perimeter of dense urban zones, by replacing the numerous obstacles 70 with a small number of global obstacle volumes VGO.

Another advantage of this reduction in the number of obstacles 70 is a simplification of the obstacle monitoring function calculation, which, instead of testing a collision risk with each obstacle 70 near the aircraft 10, tests the collision risk with a small number of global obstacle volumes VGO.

Another further advantage is a simplification of the display function of the obstacles 70 on different views presented to the pilot, which, instead of displaying each obstacle 70 near the aircraft 10, displays a small number of global obstacle volumes VGO. Thus, the risk of exceeding the calculation and display capacities of the avionics system, such as the prevention system 20, is greatly limited.

Finally, from a human factor point of view, the presentation to the pilot of simple global obstacle volumes VGO reduces the cognitive load for the pilot, in particular, the difficulties in correctly interpreting the situation and the risk of endangering the aircraft 10 following a misinterpretation of the situation.

It is thus conceived that the generation device 25 and the generation method according to the invention are more suitable for flights in the presence of numerous obstacles 70, particularly in dense urban environments.

The invention claimed is:

1. An electronic device for generating an obstacle database comprising:

an data acquirer acquiring an initial obstacle database comprising elevation and position data for several obstacles;

an obstacle creator creating at least one global obstacle volume, each global obstacle volume at least partially encompassing a plurality of obstacles and including an envelope with an upper surface of area greater than a predefined minimum area, the upper surface having a constant elevation value and being, at least at one point, distant from the ground by at least a predefined minimum height, the obstacle creator determining at least one obstacle grouping zone, each grouping zone having an obstacle density greater than a predefined minimum density and being associated with a respective global obstacle volume, and for each grouping zone, a number of fully encompassed obstacles divided by the total number of obstacles at least partially encompassed by the global obstacle volume is greater than a predefined minimum ratio; and a data generator generating a modified obstacle database from the acquired initial obstacle database, the modified obstacle database comprising the at least one created global obstacle volume, the data generator deleting, during generation of the modified obstacle database, each obstacle fully encompassed by a respective global obstacle volume.

2. The device according to claim 1, wherein the predefined minimum ratio is greater than or equal to 0.8.

3. The device according to claim 1, wherein said obstacle creator determines each grouping zone via a data partitioning algorithm, each grouping zone being polygonal in shape.

4. The device according to claim 3, wherein the data partitioning algorithm is a spatial clustering algorithm.

5. The device according to claim 4, wherein the spatial clustering algorithm is a density-based spatial clustering algorithm.

6. The device according to claim 5, wherein the density-based spatial clustering algorithm is a density-based spatial clustering of applications with noise algorithm.

7. The device according to claim 1, wherein said obstacle creator determines each grouping zone from meshes of an area covered by the initial obstacle database, by calculating for each mesh an obstacle density and an elevation characteristic of the obstacles, then grouping the connected meshes having an elevation characteristic belonging to the same predefined range of elevation values and each presenting a density greater than a predefined minimum density.

8. The device according to claim 7, wherein the elevation characteristic is equal to an average or maximum elevation of a predefined proportion of the obstacles included in the mesh.

9. The device according to claim 8, wherein the predefined proportion is substantially equal to 80% of the obstacles included in the mesh.

10. The device according to claim 1, wherein, for each global obstacle volume, the constant elevation value of the upper surface is equal to the sum of a predefined margin and the maximum value of the elevations of the obstacles fully encompassed by the global obstacle volume.

11. The device according to claim 1, wherein, for each global obstacle volume, the constant elevation value of the upper surface is equal to a predefined value.

12. The device according to claim 1, wherein the elevation is of a type chosen from among an altitude of the upper surface and a height relative to the ground of the upper surface.

13. The device according to claim 1, wherein the predefined minimum area is greater than or equal to 10 hectare.

14. The device according to claim 1, wherein the predefined minimum height is greater than or equal to 30 meters.

15. The device according to claim 1, wherein said obstacle creator creates each global obstacle volume outside landing zone(s), vertiport(s), and clearance zone(s).

16. The device according to claim 15, wherein each clearance zone is a park or a stadium.

17. A method for generating an obstacle database for an aircraft, comprising:

acquiring an initial obstacle database comprising elevation and position data for several obstacles;

creating at least one global obstacle volume, each global obstacle volume at least partially encompassing a plurality of obstacles and including an envelope with an upper surface of area greater than a predefined minimum area, the upper surface having a constant elevation value and being, at least at one point, distant from the ground by at least one predefined minimum height;

determining at least one obstacle grouping zone, each grouping zone having an obstacle density greater than a predefined minimum density and being associated with a respective global obstacle volume, and for each grouping zone, a number of fully encompassed obstacles divided by the total number of obstacles at least partially encompassed by the global obstacle volume is greater than a predefined minimum ratio;

generating a modified obstacle database from the initial obstacle database, the modified obstacle database comprising the at least one global obstacle volume; and during said generating, deleting each obstacle fully encompassed by a respective global obstacle volume.

18. A non-transitory computer-readable medium comprising a computer program comprising software instructions which, when executed by a computer, implement a method according to claim 17.

19. A non-transitory computer-readable medium, comprising an obstacle database generated via the method according to claim 17.

* * * * *